UNITED STATES PATENT OFFICE.

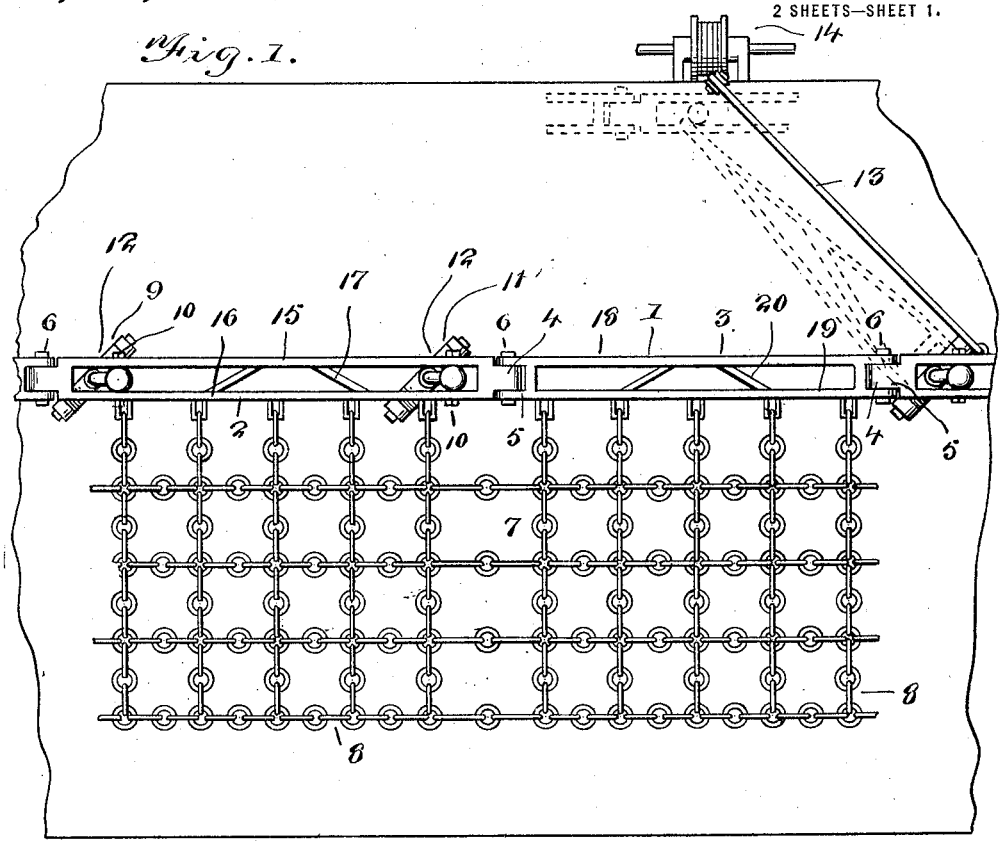

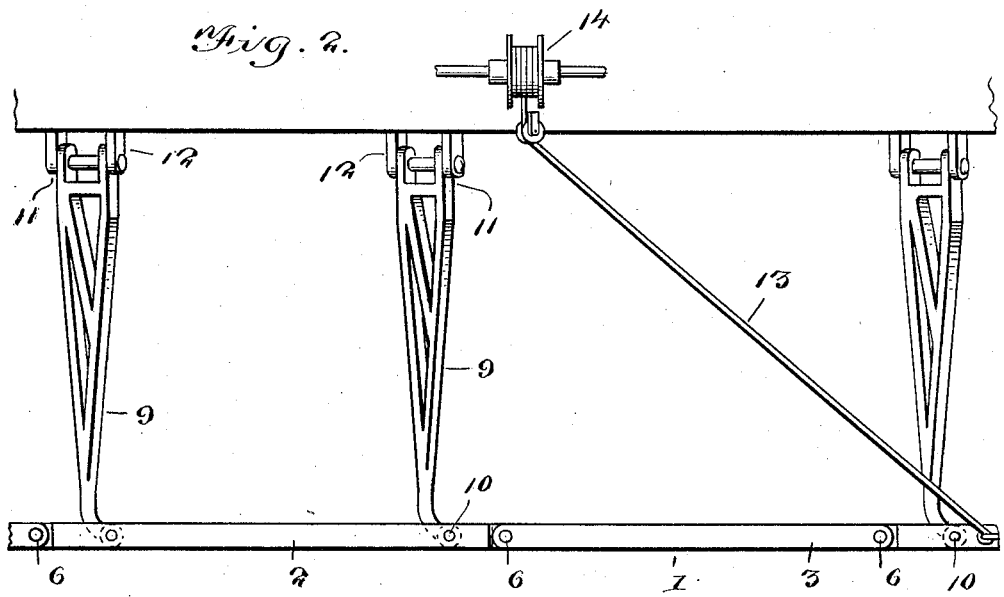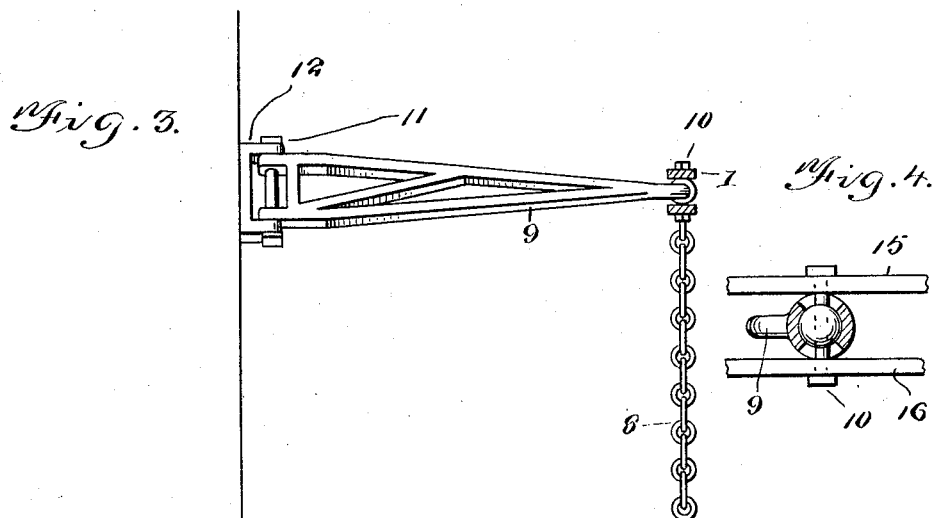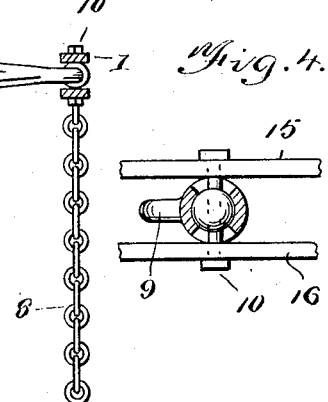

ALLA STARR, OF PADUCAH, KENTUCKY.

TORPEDO-GUARD.

1,330,729. Specification of Letters Patent. Patented Feb. 10, 1920.

Application filed July 25, 1919. Serial No. 313,207.

*To all whom it may concern:*

Be it known that I, ALLA STARR, a citizen of the United States, residing at Paducah, in the county of McCracken and State of Kentucky, have invented new and useful Improvements in Torpedo-Guards, of which the following is a specification.

This invention relates to improvements in torpedo guards for protecting vessels from torpedoes, the object of the invention being to provide an improved torpedo embodying a net and also embodying a pivotally jointed bar for holding the net and means for raising and lowering the bar and the net suspended therefrom, as required.

The invention consists in the construction, combination and arrangement of devices hereinafter described and claimed.

In the accompanying drawings:

Figure 1 is an elevation of a portion of a ship provided with a torpedo guard constructed and arranged in accordance with my invention and showing the guard lowered.

Fig. 2 is a plan of the same.

Fig. 3 is a detail view of the guard.

Fig. 4 is a detail view showing the connection between the net suspending bar and the boom.

Figs. 5 and 6 are detail views of a modified form of net suspending bar.

In the embodiment of my invention herein shown is provided a pivotally jointed bar 1 for arrangement upon each side of a vessel and at a suitable distance therefrom. The bar comprises members 2, 3 which are arranged alternately. Each member 2 has projections 4 at its ends which enter recesses 5 in the ends of the members 3, pivoting pins 6 of suitable construction passing through the ends of the members 3 and the projections at the ends of the members 2 and serving to pivotally connect said members together so that the bar as a whole is rendered flexible or yielding and to facilitate the raising and lowering of the guard. A torpedo net 8 of suitable construction is suspended from each bar upon opposite sides of the vessel, the net being continuous from stem to stern.

To hold the guard and permit the same to be raised and lowered, I provide booms 9, the outer ends of which are pivotally connected to the members 2, as at 10, and the inner ends of which are pivotally connected, as at 11, to brackets 12, which are secured on the sides of the ship. The brackets 12 are inclined and hence the outer ends of the booms, when the same are swung outwardly descend, and lower the guard, and when the booms are swung inwardly, owing to the inclination of the bar brackets, the booms serve to raise the guard as will be understood. Suitable tackles or cables 13 are connected to each of the bars and also to a windlass 14 or other suitable apparatus on the ship and hence by operating the booms by means of the tackles or cables the torpedo guard may be raised or lowered at any time as may be desired. The bar members 2 are each shown as comprising upper and lower portions 15, 16, and braces 17 connecting said portions. The bar members 3 are also shown as comprising similar upper and lower portions 18, 19 and braces 20 connecting said portions.

In the form of my invention shown in Figs. 5 and 6 in which the construction of the bar is modified, the bar comprises members $2^a$, $3^a$ of cross sectionally cross shaped angle iron each member $2^a$ having a projection 21 at each end and each member $3^a$ having yoke shaped ends 22 to receive said projections 21, pivots 23 being employed to pivotally connect the members $2^a$, $3^a$ together. Each member $2^a$ is also formed near its ends with a pair of inwardly extending lugs 24 arranged one above the other and between which the outer ends of the booms are pivotally mounted as shown.

Other modifications may be made and changes may be made in the form, proportions and construction of the several parts without departing from the spirit of my invention and within the scope of the appended claim.

Having thus described my invention, I claim:—

In combination with a torpedo guard and a vessel, a boom pivotally mounted at its inner end on the vessel, the pivot of the inner end of the boom being inclined, and the outer end of the boom being pivotally connected to the guard for universal angular movement.

In testimony whereof I affix my signature.

ALLA STARR.